US010017082B2

(12) United States Patent
Zwaan

(10) Patent No.: US 10,017,082 B2
(45) Date of Patent: Jul. 10, 2018

(54) SHOCK MITIGATION APPARATUS

(71) Applicant: Francis Paul Zwaan, Christchurch (NZ)

(72) Inventor: Francis Paul Zwaan, Christchurch (NZ)

(*) Notice: Subject to any disclaimer, the term of this patent is extended or adjusted under 35 U.S.C. 154(b) by 0 days.

(21) Appl. No.: 15/315,656

(22) PCT Filed: Jun. 5, 2015

(86) PCT No.: PCT/NZ2015/000042
§ 371 (c)(1),
(2) Date: Dec. 1, 2016

(87) PCT Pub. No.: WO2015/187037
PCT Pub. Date: Dec. 10, 2015

(65) Prior Publication Data
US 2017/0197532 A1 Jul. 13, 2017

(30) Foreign Application Priority Data
Jun. 6, 2014 (NZ) ........................ 625966

(51) Int. Cl.
*B60N 2/42* (2006.01)
*B60N 2/54* (2006.01)
*B63B 29/06* (2006.01)
*F16F 15/02* (2006.01)
*F16F 13/02* (2006.01)
(Continued)

(52) U.S. Cl.
CPC .............. *B60N 2/546* (2013.01); *B63B 29/06* (2013.01); *F16F 13/00* (2013.01); *F16F 13/02* (2013.01); *F16F 15/022* (2013.01); *B63B 2029/043* (2013.01); *B63B 2709/00* (2013.01); *F16F 2224/02* (2013.01); *F16F 2238/022* (2013.01)

(58) Field of Classification Search
CPC .................................... B60N 2/546
USPC .............. 297/216.1, 216.15, 216.16, 216.17, 297/216.18, 216.19, 216.2, 313
See application file for complete search history.

(56) References Cited

U.S. PATENT DOCUMENTS 3,602,537 A * 8/1971 Kerstholt ........... A47C 1/03238
297/300.5
3,927,854 A * 12/1975 Carey .................... B60N 2/504
248/573
(Continued)

FOREIGN PATENT DOCUMENTS

CN 203078357 U 7/2013
GB 633651 A * 12/1949 ............. B60N 2/504
(Continued)

OTHER PUBLICATIONS

International Search Report for PCT/NZ2015/000042 dated Sep. 15, 2015.

*Primary Examiner* — Rodney B White
(74) *Attorney, Agent, or Firm* — Heisler & Associates

(57) ABSTRACT

Described herein is a shock mitigation apparatus. The shock mitigation apparatus may be utilized in a marine environment, able to absorb shocks transmitted to a seat system from a structure to which the seat is affixed. The shock mitigation apparatus includes at least one leaf spring wherein the leaf spring is cantilevered at one end and pivoted at a distal end thereof, and wherein the pivoted end is free to articulate upon flexure of the leaf spring.

19 Claims, 14 Drawing Sheets

(51) Int. Cl.
*F16F 13/00* (2006.01)
*B63B 29/04* (2006.01)

(56) References Cited

U.S. PATENT DOCUMENTS

| | | | |
|---|---|---|---|
| 4,093,197 A * | 6/1978 | Carter | A47C 3/025 267/131 |
| 4,154,472 A * | 5/1979 | Bryll | B60N 2/4221 244/118.6 |
| 4,595,236 A * | 6/1986 | Rizzoli | A47C 3/025 297/300.1 |
| 4,911,501 A * | 3/1990 | Decker | A47C 1/03255 297/285 |
| 5,288,138 A * | 2/1994 | Stulik | A47C 1/03255 297/302.1 |
| 5,356,199 A * | 10/1994 | Elzenbeck | A47C 3/026 297/311 |
| 5,397,165 A * | 3/1995 | Grin | A47C 1/03255 297/300.5 |
| 5,636,424 A * | 6/1997 | Singer | B60N 2/4221 29/407.01 |
| 6,237,889 B1 * | 5/2001 | Bischoff | B60N 2/0228 180/902 |
| 6,250,715 B1 * | 6/2001 | Caruso | A47C 1/03 297/300.2 |
| 6,880,886 B2 * | 4/2005 | Bodnar | A47C 7/28 297/285 |
| 7,413,158 B1 * | 8/2008 | Burer | B60N 2/42736 248/421 |
| 7,992,937 B2 * | 8/2011 | Plikat | A47C 1/03255 297/300.2 |
| 2006/0202530 A1 * | 9/2006 | Lin | A47C 1/03238 297/300.1 |
| 2013/0169017 A1 * | 7/2013 | Masunaga | A47C 1/03255 297/320 |
| 2015/0183493 A1 * | 7/2015 | Zwaan | B63B 29/04 297/195.11 |
| 2016/0355238 A1 * | 12/2016 | Charleston | B63B 29/04 |

FOREIGN PATENT DOCUMENTS

| | | |
|---|---|---|
| GB | 912628 A | 12/1962 |
| KR | 100788108 B1 | 12/2007 |
| KR | 20-2011-0008123 U | 8/2011 |
| WO | WO 2014/007663 A1 | 1/2014 |

* cited by examiner

SHOCK MITIGATION APPARATUS

TECHNICAL FIELD

Described herein is a shock mitigation apparatus. More specifically, a shock mitigation apparatus which relates to a new and improved seating system, such as may be utilised in a marine environment, able to absorb shocks transmitted to the seat system from a structure to which the seat is affixed. The shock mitigation apparatus includes at least one leaf spring wherein the leaf spring is cantilevered at one end and pivoted at a distal end thereof, and wherein the pivoted end is free to articulate upon flexure of the leaf spring.

BACKGROUND ART

High-speed, high performance watercraft, as used in both military and civilian application, subject the passengers to repetitive high G-forces resulting from the sudden deceleration of the watercraft as it falls off waves or hits waves while going at a high forward speed and a high angle of attack. Such repetitive impacts are both debilitating to the watercraft's occupants, preventing them from carrying out their tasks, and further may result in physical injury.

Shock mitigation is minimizing the effects of a shock when a watercraft, navigating at high speed, hits a wave or a series of waves. As above, these effects can cause fatigue and injuries to the watercraft's passengers and crew especially when subjected to prolonged periods of constant impacts. Whilst a well designed and built watercraft can mostly withstand the shocks caused by these impacts, the passengers and crew experience an uncomfortable ride which reduces physical, cognitive and psychomotor performance and increases the risk of acute and chronic musculoskeletal injuries.

The effect of prolonged body movements and of the forces acting on the musculoskeletal system due to riding in high speed watercraft is, at the very minimum, fatigue. At worst, it can result in serious injury or death. Fatigue due to vibration is caused by prolonged muscle activity, both voluntary and involuntary, resulting from the body's attempt to counteract the vibration. The muscle tissue and organs themselves act as shock absorbers that try to dampen vibration and can become fatigued over time. As fatigue continues, the potential for declining work performance and injury increases due to the unpredictable nature of shocks that come from high speed navigation in significant waves.

U.S. Pat. No. 5,810,125 discloses an active shock-absorbing boat seat system that has a seat system mounted to the boat deck through an active shock absorber. Sensors monitor both the shock to be passed from the deck to the seat as well as the shock actually received by the seat after passing through the shock absorbing system. A controller monitors the shock levels and provides a continuous control signal to the shock-absorbing unit to control the response of the shock-absorbing unit during the duration of the shock. The control system can provide for adjustment of various operating parameters for the system, including initial position of the seating system, overall ride stiffness, maximum allowable shock, and other parameters.

However, a disadvantage of U.S. Pat. No. 5,810,125 is that to mitigate shock, the system requires the use of an array of components such as complex electronic controllers, sensor units, electrohydraulic servo actuators and the like. This increases the costs and potential for failure and may require ongoing maintenance especially in a marine environment.

A purely mechanical arrangement for a shock absorbing mounting system for a high speed watercraft is disclosed in WO 1992/012892. This arrangement includes two parallel rigid arms pivoted at both ends of the arms. A disadvantage of arms that are pivoted at both ends is that they do not flex during compression and therefore do not provide any restorative force. Thus, this configuration requires a separate spring, such as a coil spring interposed between the seat and the base. This spring along with the four pivot points adds weight, cost and complexity to the design. Furthermore, each additional pivot can contribute to additional 'free-play' which can produce noise and unwanted movement.

U.S. Pat. No. 5,505,521 discloses a sprung seat frame which comprises a parallel leaf spring arrangement, wherein the leaf springs are fixed or clamped at both ends such that they maintain a constant angle at both ends with out any rotation. During compression, the leaf springs become very stiff and are only able to flex in the middle, adopting an S-shape curvature. The use of computer modelling such as Finite Element Analysis (FEA) software analysing strength (compressive tensile and shear) and flexural modulus/ Young's Modulus data has shown that the configuration disclosed in U.S. Pat. No. 5,505,521 is at least four times stiffer compared to a configuration where one end of each spring is allowed to pivot freely. In order to achieve the required flex, springs configured such as those disclosed in U.S. Pat. No. 5,505,521 are required to be manufactured out of a thin material resulting in a spring having to perform under high stress. Therefore, these springs need to be manufactured out of expensive high performance materials such as titanium in order to provide an adequate service life. Also, the clamps at the ends of the spring are under high clamping forces and stress requiring the clamps to be manufactured from heavy bent and welded marine-grade stainless steel plate, thus adding to both the weight and cost of the apparatus.

An alternative embodiment is disclosed in U.S. Pat. No. 5,505,521 that includes an adjustment device that is rotated and then fixed to adjust the curvature of the spring permitting mechanical prestressing of the spring arrangement and thus adjustment of the seat frame according to user weight. Once the spring stiffness/height of the seat is pre-set, the apparatus has the same behaviour and limitations as above since the apparatus is configured with parallel leaf springs with a fixed clamp at both ends such that they maintain a constant angle at both ends without any rotation.

Also, a further problem with all of the mechanical arrangements described above is that they only allow primary shock mitigation in one direction i.e. vertical movement only. Optimally, mitigation apparatus also should factor in lateral stability requirements of occupants where a lateral impact force can have a considerable effect on the body. A lateral impact force can lead to excessive lateral movement of the torso and neck resulting in spinal injuries.

There are a number of other specialist shock mitigation apparatus known in the art with varying configurations manufactured by companies such as Shockwave seats, Ullman Dynamics, Coastshox, X-Craft Suspension Seats and Scot Seats to name a few. However, as above the majority of the shock mitigation apparatus manufactured by these companies only allow for primary shock mitigation i.e. vertical movement only. Also due to their designs requiring construction from marine-grade stainless steel, they are complex, heavy, with many parts requiring labour-intensive manufacturing processes, making them expensive to manufacture.

To overcome the problem of the above, Scot Seats have developed an exemplary shock mitigation seat system which in addition to primary mitigation allows for secondary mitigation in the lateral direction. However, as a result of the rigid construction of the mounting point pivot members, additional componentry referred to as a "shuffle system" is required to effect mitigation in the lateral direction. This results in additional costs for manufacture and a more complex arrangement of componentry to achieve its objective than is necessary. Furthermore, this mitigation seat system does not allow for ease of tuneability to alter and/or control flexure within the spring in three planes of movement (longitudinal surge, vertical heave and lateral sway) and axes of rotation (roll, pitch and yaw) depending on occupant and/or particular application.

It should be appreciated from the above, that there is a need for a shock mitigation apparatus which is capable of counteracting impact motion in three planes of movement and axes of rotation, substantially preventing the resulting forces which are transmitted to a seat occupant through the seat structure, from reaching the seat and its occupant; yet the design allows for the use of lightweight cost effective materials avoiding the need for separate bearings or heavy duty clamps. Furthermore, it would be advantageous if the above can be achieved with a simplified design requiring minimal componentry or to at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art, in New Zealand or in any other country.

For the purpose of this specification the term 'comprise' and grammatical variations thereof shall have an inclusive meaning—i.e. that it will be taken to mean an inclusion of not only the listed components it directly references, but also other non-specified components or elements.

Further aspects and advantages of the process and product will become apparent from the ensuing description that is given by way of example only.

SUMMARY

Described herein is a shock mitigation apparatus. The shock mitigation apparatus may be utilised in a marine environment, able to absorb shocks transmitted to a seat system from a structure to which the seat is affixed. The shock mitigation apparatus includes at least one leaf spring wherein the leaf spring is cantilevered at one end and pivoted at a distal end thereof, and wherein the pivoted end is free to articulate upon flexure of the leaf spring.

In one aspect there is provided a shock mitigation apparatus including:
  at least one seat member;
  a lower mount member configured to securely mount a first end of at least one leaf spring;
  an upper mount member attached to the seat member, wherein the upper mount member is configured to securely mount a second end of the at least one leaf spring;
  wherein the at least one leaf spring is cantilevered at one end and pivoted at a distal end thereof, and wherein the pivoted end is free to articulate upon flexure of the leaf spring.

The shock mitigation apparatus described above confers a number of advantages. A first advantage of a shock mitigation apparatus that includes a leaf spring with a freely moving or articulating pivot at one end thereof allows the number of pivot points to be halved relative to for example, a rigid arm assembly with moveable pivots at each end. This in turn reduces the cost, weight, complexity of design and 'free-play'. As is known in the art, additional pivot points can contribute to additional 'free-play' which can produce noise and unwanted movement. Also, the use of a cantilever leaf spring allows the distance between a pivot point to be increased, thereby further reducing 'free-play'.

Secondly, the symmetry of a leaf spring that includes a cantilever and pivot arrangement enables two or more identical springs to attach to each other by allowing the pivotal end of a first spring to nest in the cantilever end of a second spring, which can avoid the need for additional componentry such as separate bearings or clamps. Thus, this symmetrical design may minimise the main component count to few as five components including the seat, mount members (one of which may be integral with the seat), leaf springs and damper.

Thirdly, the greater flex that results from a leaf spring cantilevered at only one end (and pivoting at the other) allows the leaf spring to be manufactured out of thicker gauge material and thus increases the service life of the leaf spring. This advantage may appear counterintuitive, but a leaf spring with greater flex and thicker gauge wall section facilitates the use of injection moulded composite plastics that have greatly reduced cost compared to their thin titanium metal counterparts.

As above, other components such as the mounting members and seat (dictated by the shock mitigation apparatus design with a cantilevered leaf spring and free moving pivot arrangement with more flex) are much more amenable to a design for injection moulding. This further reduces apparatus costs as manufacture of the injection moulded componentry is fast, less labour intensive and utilises low cost, non-corrosive materials that require no cutting, bending, welding polishing or painting.

The use of a leaf spring in the apparatus allows for shock mitigation in three axes i.e. three planes of movement and axes of rotation. This may enable an occupant to reduce the amount of shock transmitted to their body from both vertical and lateral impact forces thereby preventing excessive movement of the torso and neck and reducing the likelihood of spinal injuries (unlike coil or air springs that function in only one direction).

Furthermore, the apparatus is adjustable where the aperture in the leaf spring allows the leaf spring to be tuned to control the amount of flexure or compliance required depending on occupant and particular application. This overcomes a problem of prior art shock mitigation apparatus where the flexure of the spring is not tuneable. For example, the flexure may be tuned to provide a progressive rate spring or may be tuned to control the stiffness of the spring independently of the three axes where a softer or firmer spring may be manufactured to accommodate side loadings without altering the spring stiffness vertically and/or fore and aft.

Also, for apparatus durability, the aperture minimises bending stress of the spring at a region where the spring is mounted to the apparatus. Another advantage of having an aperture in the spring is that it may have a secondary physical function acting as a clearance hole to allow fitment of optional componentry such as a damper to pass through the spring. The use of a pair of leaf springs in a substantially parallel arrangement provides for additional torsional rigidity of the apparatus.

Furthermore, the apparatus may include a height adjustment mechanism that allows the seat member to be moved vertically without affecting the vertical travel of the leaf spring and/or optional damper inserted therebetween.

Finally, the apparatus is easily configurable depending on user preference. For example, the seat members may be modular allowing interchangeable units of a pommel design, a leaning post attachment and/or a regular design seat without having to replace the entire seat member.

BRIEF DESCRIPTION OF THE DRAWINGS

Further aspects of the shock mitigation apparatus and uses will become apparent from the following description that is given by way of example only and with reference to the accompanying drawings in which:

FIG. 9 illustrates a cross sectional view of a leaf spring embodiment with an aperture for a damper to pass through;

DETAILED DESCRIPTION

Figure 1:
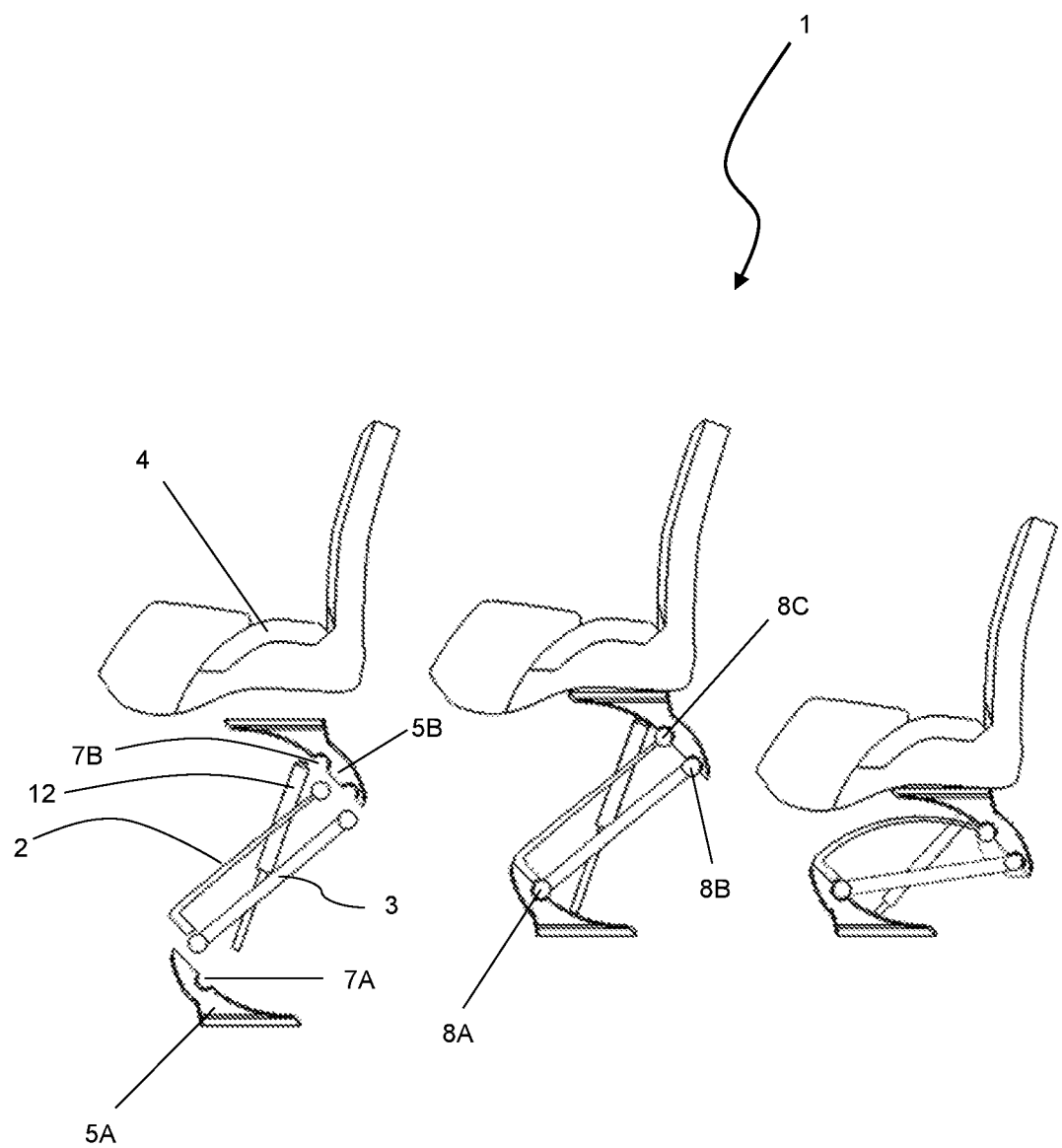
FIG. 1 illustrates a series of side views of a first embodiment of a shock mitigation apparatus that includes one leaf spring and a stabilizer arm (from left to right): an unassembled apparatus with exploded view of components, an assembled apparatus upon an upward rebound stroke, and an assembled apparatus during a compression stroke.

As noted above, described herein is a shock mitigation apparatus. The shock mitigation apparatus may be utilised in a marine environment, able to absorb shocks transmitted to a seat system from a structure to which the seat is affixed. The shock mitigation apparatus includes at least one leaf spring wherein the leaf spring is cantilevered at one end and pivoted at a distal end thereof, and wherein the pivoted end is free to articulate upon flexure of the leaf spring.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'seat member' or grammatical variations thereof refers to any platform on which a person or other object may be supported. The term is not limited to platforms taking the shape of a conventional seat suitable for supporting a single person as illustrated in the Figures, and may include other embodiments, for example a bench seat suitable for supporting multiple people or a platform suitable for supporting a standing person or other objects such as cargo.

The term 'leaf spring' or grammatical variations thereof refers to at least one strip of material distinct from a coil, that stores potential energy when it is compressed, stretched, or bent and releases that energy when a restraining force is removed. A non-limiting example of a leaf spring may take the form of a substantially rectangular or trapezoidal cross-section with a semi-elliptical, elliptical, parabolic shape, or trapezoid-shape when under load. For ease of reference, the 'leaf spring' may be simply referred to as a 'spring' throughout the specification.

The term 'aperture' or grammatical variations thereof refers to a hole(s) or opening(s) of a leaf spring therein that can be of varied shapes and/or dimensions specifically shaped by cutting or other means. The purpose of the aperture therein of the leaf spring is to tune and control flexure or compliance within the leaf spring for shock mitigation in three planes of movement and axes of rotation. The shape, multiple number, position and/or dimensions of the aperture(s) may be dependent on the desired flexure characteristics of the spring that may be deemed suitable for a particular occupant and/or application.

The term 'three planes of movement' refers to motion or movement of a body with respect to a substantially planar surface, namely in a longitudinal direction (surge fore and aft), vertical direction (heave up and down) and lateral direction (sway side to side).

The term 'three axes of rotation' refers to circular motion or movement of a body around an axis of rotation, namely roll, pitch and yaw axes.

The term 'mount member' refers to an assembly or structural component for retaining either the cantilevered end and/or the pivotal end of the leaf spring.

The terms 'lower' and 'upper' with reference to the leaf springs and/or mount members should be understood to refer to the relative position of the leaf springs and/or mount members with respect to a base assembly or mounting surface. The lower leaf spring and/or mount member being the one(s) proximal to a base member or mounting surface and the upper leaf spring and/or mount member being the one(s) distal to a base member or mounting surface.

In one aspect there is provided a shock mitigation apparatus including:
 at least one seat member;
 a lower mount member configured to securely mount a first end of at least one leaf spring;
 an upper mount member attached to the seat member, wherein the upper mount member is configured to securely mount a second end of the at least one leaf spring;
 wherein the at least one leaf spring is cantilevered at one end and pivoted at a distal end thereof, and wherein the pivoted end is free to articulate upon flexure of the leaf spring.

In one embodiment, there may be one leaf spring with a stabilizer arm pivotally connected at each end to the lower and upper mount members.

The stabilizer arm may be aligned substantially parallel and mounted either above or below the leaf spring. In this way, in lieu of an additional leaf spring, vertical movement may occur with a constant inclination where the stabilizer arm does not flex, but may pivot at both ends such that leaf spring may flex along its length forming a parabolic curve and pivots at one end thereby to prevent a pitching motion.

It should be appreciated by those skilled in the art that in this configuration, the pivotal end of the spring may be mounted to the upper mount member or conversely the spring and mount member may be reversed such that pivotal end of the spring maybe mounted to the lower member. The inventor has found that both configurations operate in a similar fashion and provide for comparative flexure characteristics and dynamics.

The amount of pitch may be may be tuned. For example, the amount of pitch may be reduced by increasing the length of the stabilizer arm, thus the pivot points common to the upper mount are more horizontal with respect to each other and are a further distance apart.

The length of the stabilizer arm also may be adjusted to effect height adjustment depending on user specifications.

In lieu of stabilizer arm, the shock mitigation apparatus may include a pair of lower and upper leaf springs in a substantially parallel arrangement with respect to each other for torsional rigidity.

The leaf springs may flex along their length and pivot at the same end with respect to each other as a consequence of the pivotal ends of the springs being mounted to the same lower or upper mount member. As previous, the spring and clamp may be reversed such that both pivotal ends of the springs maybe mounted to either the lower or upper mount member. The inventor has found that both configurations operate in a similar fashion and provide for comparative flexure characteristics and dynamics.

An advantage of this configuration is the symmetry of the leaf springs maintains the seat at the same tilt angle during upward rebound and compression strokes when a downward force may be applied centrally on the seat. Also, the amount of pitch may be reduced by increasing the parallel distance between the springs and/or pivots. Furthermore, substantially parallel leaf springs configured with pivots at the same end allow for ease of height adjustability and increased spring firmness. This is because the inclination of both springs can be adjusted by altering the inclination at both fixed or clamped ends of the leaves and thus adjustment of the seat frame according to user height and/or weight.

In one preferred embodiment, the shock mitigation apparatus may include a pair of lower and upper leaf springs in a substantially parallel arrangement with respect to each other for torsional rigidity, but may flex along their length and pivot at opposite ends with respect to each other as a consequence of each pivotal end of the springs being mounted to opposing lower or upper mount members. As previous, the spring and clamp may be reversed such that the pivotal end of the upper spring may be mounted to the lower mount (pivotal end of the lower spring mounted to the upper mount) or the pivotal end of the upper spring may be mounted to the upper mount (pivotal end of the lower spring mounted to the lower mount). The inventor has found that both configurations of opposing pivots operate in a similar fashion and provide for comparative flexure characteristics and dynamics.

The pivot of the upper leaf spring may be mounted on the lower mount member and the pivot of the lower leaf spring may be mounted on the upper mount member. In this configuration, the substantially parallel leaf springs may be spaced apart to minimise the springs contacting one another as they flex inwards towards each other during compression.

An advantage of this configuration is that the symmetry of the leaf springs maintains the seat at the same tilt angle during upward rebound and compression strokes when a downward force may be applied centrally on the seat. Also, by positioning the pivots at opposite ends they become separated by a larger distance relative to two or more pivots mounted on the same mount member which results in reduced pitching as described above.

Preferably, the pivot of the upper leaf spring may be mounted on the upper mount member and the pivot of the lower leaf spring may be mounted on the lower mount member In addition to the advantages previously described above, this configuration provides yet a further advantage in that the springs flex away from one another during compression so that the parallel distance between them is not limited or governed by the amount of flexure. Therefore, the compliance of the apparatus in the fore-aft direction may be adjusted by selecting the appropriate separation distance between the two springs. Also, the inventor has found that increasing the separation distance between the two springs stiffens the suspension against fore-aft pitching while reducing this distance produces a softer feel to the seat in that direction.

The leaf spring may be tapered wherein the thickness of material reduces gradually from a fixed cantilevered end to a distal pivotal end of the spring. In this way, a tapered spring allows for greater deflection with a decrease in stress of material.

The leaf spring may be manufactured out of the following materials: plastic, titanium, stainless steel, spring steel or a composite material. Other factors to consider when selecting a material for a leaf spring of the invention include ultraviolet stability, strength (compressive tensile and shear), flexural modulus/Young's Modulus and Factor of Safety (FOS) derived from strength and modulus data.

More preferably, the leaf spring may be manufactured out of injection mouldable materials such as plastic, which has a modulus of approximately 1000 MPa-9000 MPa without any reduction in strength. The spring may be manufactured out of injection mouldable materials because the cantilever and pivotal configuration of the leaf spring allows for a spring to be manufactured from thicker gauge material yet with lower stress on the material. An advantage of a spring being able to be manufactured out of injection moulded material is that the spring can be economically manufactured to any desired shape to ensure uniform stress within the spring. As above, uniform stress may be achieved by tapering the leaf so that the gauge of material is greater at its fixed end relative to the distal pivotal end of the spring. Thus, a taper may increase the maximum deflection of the spring, reducing peak stress and leading to increased service life of the spring.

The inventor has found that the overall dimensions of width, length and thickness of the leaf spring may be important factors for optimum operation of the shock mitigation apparatus.

The width of the leaf spring may be approximately 100 to 400 mm. More preferably, the width may be 300 mm. If the spring is too narrow, the spring may twist resulting in lack of lateral stability and if the spring is too wide, the spring may not fit under a conventional seat and the occupant or other passenger may contact and collide with the spring when in use. It should be noted that if the spring is doubled in number (e.g. the use of two springs versus one spring irrespective of whether they are configured side by side or one above the other), this may have the same vertical stiffness and therefore the same effect of doubling the width of the spring. Also, the stiffness of the spring may be proportional to the width of the spring i.e. twice as wide results in the spring being twice as stiff (the force required to deflect the spring a given distance is doubled).

The length of the spring may be approximately 100 to 500 mm. More preferably, the length may be 350 mm. If the spring is too short, the spring may have limited travel and if the spring is too long, the spring may not fit under a conventional seat and the occupant or other passenger may contact and collide with the spring when in use.

The inventor has found that the length of the spring may need to be approximately double the vertical stroke, wherein a typical vertical stroke of the spring may be approximately 50 to 200 mm. Outside these ranges, either the cushioning effect of the spring may be reduced or the occupant may lose visibility of the horizon at the bottom of travel. It should be noted that if a spring is doubled in number and connected end to end, this may have the same vertical stiffness as doubling the length of the spring. Also, the stiffness of the spring may be inversely proportional to the cube of its length i.e. twice as long results in the spring being eight times less stiff (the force required to deflect the spring a given distance is reduced by a factor of eight).

The thickness of the spring may be approximately 1 mm to 25 mm depending on the elasticity of the material and the amount of taper. Preferably, the thickness of a plastic injection moulded spring may be less than 15 mm. Accordingly, increasing the thickness of a leaf spring may make it much stiffer and also may increase the strain when it curves during deflection. For example, in composite materials this strain may cause cracking and may place an upper limit on practical thickness of a material. Conversely, decreasing the thickness of a leaf spring may make it less stiff because the cross-section is reduced. In order to maintain the same stiffness of the spring, a stiffer material may be utilised and have a proportionately higher strength to withstand the more concentrated stresses in the reduced cross-sectional area (since stress is force divided by area). It should be noted that if a spring is doubled in number and configured to be one above the other, this may not have the same vertical stiffness as doubling the thickness of the spring, even if the distance between them is negligible. Also, the stiffness of the spring may be proportional to the cube of the material thickness i.e. a material twice as thick results in the spring being eight times stiffer (the force required to deflect the spring a given distance is increased by a factor of eight). However, the stiffness of two springs sandwiched together may be only double that of the single spring. Without being bound by theory, two springs configured in this way may not deform like a single spring, but may have the ability to slide one over the other during flexure.

The leaf spring may include a fold or kink at one end of the spring. Preferably, the kink may be located at one fixed end of the spring. In this way, the pivotal end of a first spring may be allowed to nest in the cantilever end of a second identical spring, thus eliminating the requirement for a separate pillow block to mount the pivotal end. Also, this configuration may reduce the overall length of the spring because the clamp faces occupy unused space between the springs.

The pivotal end of the leaf spring may include an integral retaining member in the form of a disc to minimise lateral movement. Also, this configuration may eliminate the requirement for a separate fastener or end-float limiter.

The non-pivot or cantilevered end of the leaf spring may be rigidly fixed to the lower or upper mount member by either a single-sided or double-sided clamping mechanism. In this way, the leaf spring maintains a constant angle without any rotation. As will be appreciated, a double-sided clamping mechanism may provide more secure clamping relative to a single-sided mechanism. Nevertheless, a single-sided clamping mechanism may provide for the lowest cost and weight option and may be the preferred embodiment at both the upper and lower mount members.

The lower and upper mount members may be symmetrical to provide uniform clamping pressure where the fixed end of the spring(s) may be clamped by the clamping mechanism.

The lower and upper mount members may include an elongate recess or channel to receive the pivotal end of the spring(s) and at least one aperture to receive at least one fixing element to retain the fixed end of the spring(s).

The lower or upper clamp members may include a height adjustment mechanism configured to tilt one cantilever end of the leaf spring to provide adjustment of the seat member in a vertical plane of movement without affecting vertical travel of the leaf spring and/or a damper inserted therebetween. A similar tilting clamp member at the opposite end can be used to incline the seat to a comfortable seating angle.

The leaf spring may include at least one aperture dimensioned and shaped to allow fitment of a damper to pass through the leaf spring. An advantage of a spring with an aperture(s) is that it may allow an optional damper to pass directly through it, rather than in front, behind or to either side of the spring. This means that the damper may be substantially under the centre of mass of the seat and occupant and absorbs forces while minimising minimizing moments. Also, this configuration may allow for lighter construction of the apparatus without racking or twisting.

The use of a damper as described above, may absorb additional energy and minimise oscillation of the leaf spring. The damper may be a hydraulic piston filled with oil or other liquid and optionally may include a coil spring.

It should be appreciated that the shape, multiple number, position, and/or dimensions of the aperture(s) therein the leaf spring, may be dependent on the desired flexure characteristics of the leaf spring and tuned for a particular occupant and/or application. The use Factor of Safety (FOS) stress maps may be measured using strain gauges or predicted using computer modelling such as Finite Element Analysis (FEA) software to optimise the above physical aspects of the aperture(s) to give the desired flexure or compliance characteristics.

The inventor has found that the more elongated and tapered the aperture e.g. an elliptical or oval aperture, the more the stress can be evened out within the spring. For example, the band of highest stress (where the spring is clamped) may be reduced (and hence factor of safety increased) relative to a spring with a circular aperture therein or a spring without an aperture. Preferably, the factor of safety for the stress in a material of the spring is at least greater than or equal to 2.

The aperture may be substantially centrally located in the spring therein or may include two or more apertures therein separated by a bridge.

In preferred embodiments, the aperture of the leaf spring may be dimensioned and shaped to minimise bending stress of the leaf spring at a region where the spring may be clamped to the mount members.

The aperture of the leaf spring may be dimensioned and shaped to tune and control stiffness of the leaf spring independently of the three planes of movement and axis of rotation.

In particular, the inventor has found that flexure or compliance of the spring may be tuned by altering the shape and dimensions of the aperture. For example, the more rounded corners and lateral bridging that may be introduced to the apertures therein of the spring, increases the lateral stiffness. The amount of lateral stiffness desired may vary according to seat type and application. A spring with no aperture may provide maximum lateral stiffness, however this may be at the expense of tuneability of other flexural or compliance characteristics of the spring.

The lateral stiffness or compliance of the spring may approximately range from 0.1 mm/kg to 1.2 mm/kg laterally and independently of vertical compliance.

Similarly, the fore and aft flexure or compliance of the spring may be tuned where the aperture may be shaped to have an oval direction approximately at right angles to the axis of motion, such that the spring with the oval aperture (which may be of a thicker dimension for the same vertical stiffness) has increased compliance relative to a spring with no aperture. An advantage of the aperture is that there is a means by which independent control of compliance may be achieved in each of the directions: longitudinal (surge fore and aft), vertical (heave up and down) and lateral (sway side to side).

The aperture of the leaf spring may be dimensioned and shaped to provide a progressive stiffening rate of the flexure within the leaf spring. An advantage of a leaf spring with an aperture clamped to the clamping members as described may be that the spring becomes progressively stiffer as it becomes loaded. This means that the spring may be soft initially, but not bottom out under high loads (300 kg or more).

In preferred embodiments, the flexure of the leaf spring is tuned to provide more flex approximately at the pivoted region of the leaf spring for an initial soft spring rate response followed by a progressively firmer spring rate response upon further compression of the leaf spring, thereby avoiding bottoming out of the leaf spring against a stop. This provides comfort to an occupant in light conditions and prevents injury from the jarring of hitting a stop under heavy conditions.

The leaf spring may be configured to allow vertical travel of at least 150 mm to avoid bottoming out of the leaf spring against a stop.

A spring with two apertures therein may be asymmetric to allow variation in placement of larger dimensioned apertures where the apertures in upper and lower springs may align or where the larger dimensioned apertures may be at opposite ends with respect to each other to allow for a different trajectory for a damper.

In alternative embodiments, the shock mitigation apparatus may include a visco-elastic or shear-thickening (non-Newtonian) material to provide compression and/or rebound damping.

The visco-elastic material may be inserted in a space or void therein between a spring and its corresponding mount member to provide damping of the downward motion of the apparatus during compression of the springs.

The visco-elastic material may be inserted in a space or void therein between adjacent springs to provide damping of the upward motion of the apparatus during rebound of the springs.

An advantage of utilising visco-elastic material is that it may provide a cost and weight saving compared with a mechanical shock absorber or damper. It also may minimise moving parts and potential corrosion of the shock absorber.

In further alternative embodiments, the shock mitigation apparatus may include at least one air bladder in the seat member in fluid communication with at least one air bladder in a space or void therein between adjacent springs to provide damping of the downward and upward motion of the apparatus during compression and rebound of the springs. In this way, in a spring configuration where adjacent springs flex away from each other, the air bladder in the void may use the energy released by the decompressing springs to pump air back into the air bladder in the seat member for the next impact. For example, during compression of the seat member, air may pump out of the bladder in the seat member through a control valve and into the air bladder between adjacent springs. Conversely, on an upward rebound stroke the reverse occurs where the air bladder deflates between the adjacent springs such that the air may be pumped back into the seat member bladder, through another control valve.

The valves may be adjustable to allow the desired amount of compression and rebound damping.

The air bladder in the seat member may be connected via a tube to the air bladder in the space or void therein between the adjacent springs.

The seat member may be a modular unit comprising interchangeable units of a pommel design seat, a leaning post attachment and/or a regular chair design seat. In this way, seat modules may be quickly interchanged with or without tools depending on use. For example, a larger size seat to fully sit on for more relaxed use, a leaning post attachment for medium speeds with the ability to change seating preferences according to the sea conditions and the intended speed of travel.

The pommel design seat may extend forward from a back rest to allow an occupant to sit astride and give maximum lateral stability and a firm footing in use.

The seat member may be mounted in a reverse orientation relative to the base assembly to decrease the overall footprint of the apparatus. In this way, a reverse orientation can allow better utilisation of space in some watercraft, altered dynamics and a different aesthetic appeal depending on user preferences.

The seat member may include a swivelling mechanism to enable the seat member to rotate up to 360 degrees with respect to the base assembly. For example, a swivel disc may be included to facilitate turning and locking of the seat for different types of use.

The shock mitigation apparatus may include a base assembly integrated or fixed to the lower mount member.

The base assembly may be a plinth. An advantage of a plinth design is that it may include an access port to access a storage compartment contained therein. Also, the plinth may include a floor to provide hidden fastenings and a recess for adjustable positioning and/or fitment of a damper. However, this should not be seen as limiting as a base assembly should be understood to refer to any member about which the apparatus may be secured to a deck or ground surface.

In one embodiment, the base assembly may be flanges integrated or attached to the lower mount member to allow direct attachment to a deck or ground surface.

In another embodiment, a plurality of shock mitigation apparatus may be mounted to the base assembly substantially in a row or adjacent to each other. In this way, multiple shock apparatus may be installed in a watercraft to allow multiple users to sit substantially adjacent to or in front/back of each other.

Advantages of the above shock mitigation apparatus may include the following:

The apparatus includes a leaf spring with a freely moving or articulating pivot at one end thereof which may allow the number of pivot points to be halved relative to for example, a rigid arm assembly with moveable pivots at each end. Minimizing moveable pivots may reduces the cost, weight, complexity of design and 'free-play'. As is known in the art, additional pivot points can contribute to additional 'free-play' which can produce wear, noise and unwanted movement.

The apparatus utilises a cantilever leaf spring that may allow the distance between pivot points to be increased, thereby further reducing wear, maintenance and 'free-play'.

The leaf spring symmetry of the apparatus includes a cantilever and pivot arrangement that enables two or more springs to attach to each other by allowing the pivotal end of a first spring to nest in the cantilever end of a second spring, which can avoid the need for additional componentry such as separate bearings or clamps. Thus, this symmetrical design may minimise the main component count to few as five components including the seat, base, leaf springs and damper, where the seat and base have the mount member integral within them.

The apparatus includes a leaf spring cantilevered at only one end (and pivoting at the other) that results in greater flex. This in turn allows the leaf spring to be manufactured out of thicker gauge material and thus increase the service life of the leaf spring. This advantage may appear counterintuitive, but a leaf spring with greater flex and thicker gauge wall section facilitates the use of injection moulded composite plastics that have greatly reduced cost compared to their thin titanium metal counterparts. As above, other components such as the mounting members and seat (dictated by the shock mitigation apparatus design with a cantilevered leaf spring and free moving pivot arrangement with more flex) are much more amenable to a design for injection moulding. This further reduces apparatus costs as manufacture of the injection moulded componentry is fast, less labour intensive and utilises low cost, non-corrosive materials that require no cutting, bending welding polishing or painting.

The apparatus may allow for shock mitigation in three axes i.e. three planes of movement and axes of rotation. This may enable an occupant to reduce the amount of shock transmitted to their body from both vertical and lateral impact forces thereby preventing excessive movement of the torso and neck and reducing the likelihood of spinal injuries (unlike coil or air springs that function in only one direction).

The apparatus may be adjustable where the aperture in the leaf spring allows the leaf spring to be tuned to control the amount of flexure or compliance required depending on occupant and particular application. This overcomes a problem of prior art shock mitigation apparatus where the flexure of the spring is not tuneable. For example, the flexure may be tuned to provide a progressive rate spring or may be to control the stiffness of the spring independently of the three axes where a softer or firmer spring may be manufactured to accommodate side loadings without altering the spring stiffness vertically and/or fore and aft.

The apparatus is durable where the material of the spring, the taper and the aperture minimise bending stress of the spring at a region where the spring is clamped to the clamping mechanism.

Another advantage of having an aperture in the spring is that it may have a secondary physical function acting as a clearance hole to allow fitment of optional componentry such as a damper to pass directly through the spring rather than in front, behind or to either side of the spring. This means that the damper unit can be mounted directly under the centre of mass of the seat member and occupant and absorb forces while minimizing moments. Also, this configuration may allow for lighter construction of the apparatus without an undesirable increase in racking or twisting.

The use of a pair of leaf springs in a substantially parallel arrangement provides for additional torsional rigidity of the apparatus.

The use of a pair of leaf springs in a substantially parallel arrangement that flex along their length and pivot at the same end with respect to each other maintain the seat at the same tilt angle during upward rebound and compression strokes when a downward force may be applied centrally on the seat. Also, the amount of pitch may be reduced by increasing the parallel distance between the springs and/or pivots. Furthermore, substantially parallel leaf springs configured with pivots at the same end allow for ease of height adjustability and increased spring firmness. This is because the inclination of both springs can be adjusted by altering the inclination at both fixed or clamped ends of the leaves and thus adjustment of the seat frame according to user height and/or weight.

The use of a pair of leaf springs in a substantially parallel arrangement that flex along their length and pivot at opposite ends with respect to each other provides additional advantages such as reduced pitching, increased tuneability and stiffness of the spring in the fore-aft direction, as a result of a larger distance between two pivot points.

The use of a leaf spring that includes a fold or kink at one end of the spring. This configuration allows the pivotal end of a first spring to nest in the cantilever end of a second identical spring, thus eliminating the requirement for a separate pillow block to mount the pivotal end. Also, this configuration may reduce the overall length of the spring because the clamp faces occupy unused space between the springs.

The configuration of the apparatus allows for the use of visco-elastic materials. For example, a visco-elastic material may be inserted in a space or void therein between adjacent springs to provide damping of the upward motion of the apparatus during rebound of the springs. An advantage of utilising visco-elastic material is that it may provide a cost and weight saving compared with a mechanical shock absorber or damper.

The configuration of the apparatus allows for the use of at least one air bladder in the seat member in fluid communication with at least one air bladder in a space or void therein between adjacent springs to provide damping of the downward and upward motion of the apparatus during compression and rebound of the springs. In this way, in a spring configuration where adjacent springs flex away from each other, the air bladder in the void may use the energy released by the decompressing springs to pump air back into the air bladder in the seat member for the next impact. For example, during compression of the seat member, air may pump out of the bladder in the seat member through a control valve and into the air bladder between adjacent springs. Conversely, on an upward rebound stroke the reverse occurs where the air bladder deflates between the adjacent springs such that the air may be pumped back into the seat member bladder, through another control valve. The valves may be adjustable to allow the desired amount of compression and rebound damping. The air bladder in the seat member may be connected via a tube to the air bladder in the space or void therein between the adjacent springs.

Furthermore, the apparatus may include a height adjustment mechanism that allows the seat member to be moved vertically without affecting the vertical travel of the leaf spring or optional damper inserted therebetween.

The apparatus is easily configurable depending on user preference. For example, the seat members may be modular allowing interchangeable units of a pommel design, a leaning post attachment and/or a regular design seat without having to replace the entire seat member.

The embodiments described above may also be said broadly to consist in the parts, elements and features referred to or indicated in the specification of the application, individually or collectively, and any or all combinations of any two or more said parts, elements or features. Further, where specific integers are mentioned herein which have known equivalents in the art to which the embodiments relate, such known equivalents are deemed to be incorporated herein as of individually set forth.

WORKING EXAMPLES

The above described shock mitigation apparatus and uses are now described by reference to specific embodiments and examples.

Example 1 Single Cantilever Leaf Spring Combined with Stabiliser Stabilizer Arm

Referring to FIG. 1, a series of side views of a shock mitigation apparatus 1 that includes one leaf spring 2 and a stabilizer arm 3 are shown (from left to right): an unassembled apparatus 1 with exploded view of components, an assembled apparatus 1 upon an upward rebound stroke, and an assembled apparatus 1 during a compression stroke.

Figure 12:
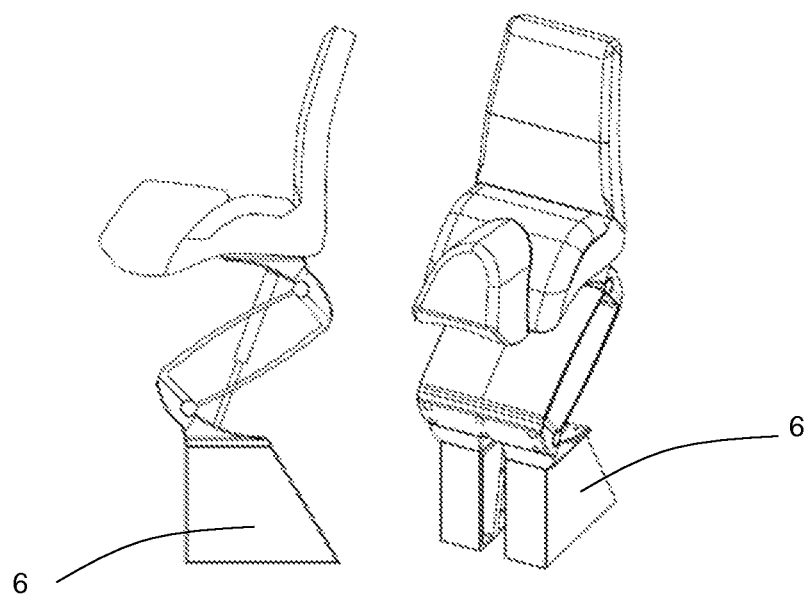
FIG. 12 illustrates a side and perspective view of the shock mitigation apparatus including a base assembly in the form of a plinth.

The shock mitigation apparatus 1 also includes a seat member 4 in the form of a pommel design as illustrated and lower and upper mount members 5A,B manufactured out of injection moulded plastic in known fashion. The lower mount member 5A is attached to the sole of a boat (not shown) with fasteners and reinforcing plates/washers (not shown) in known fashion. Optionally, and best seen in FIG. 12, the lower mount member 5A may be securely mounted to a base assembly in the form of a plinth 6 and in turn attached to the sole of the boat.

The lower mount member 5A includes a channel or recess 7A to securely retain one end of the stabilizer arm 3 and thus form a first freely moving pivot 8A. The distal end of the stabilizer arm 3 is also securely retained by a recess 7B in the upper mount member 5B to form a second freely moving pivot 8B. The stabilizer arm 3 is substantially aligned parallel and in this example mounted below the leaf spring 2.

Figure 7:
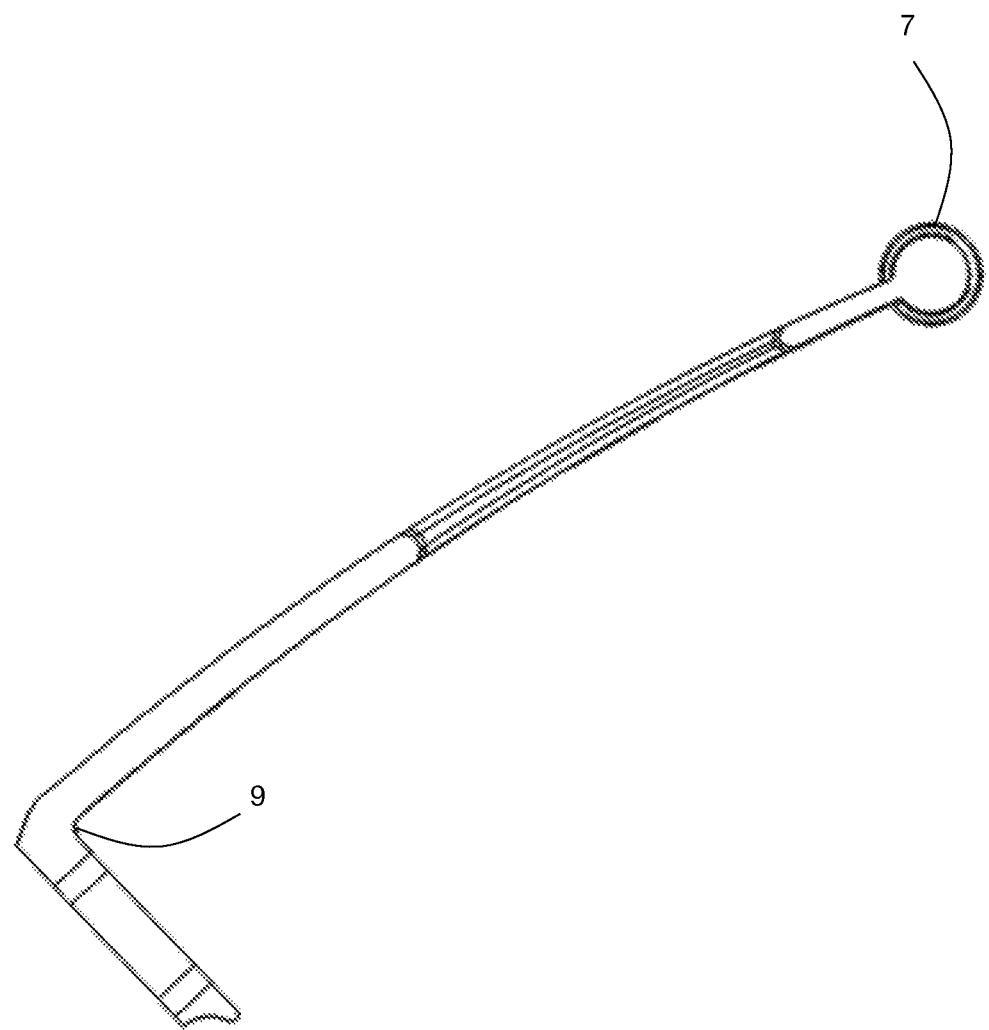
FIG. 7 illustrates a cross sectional view of a tapered leaf spring of a preferred embodiment of the present invention.
Figure 8:
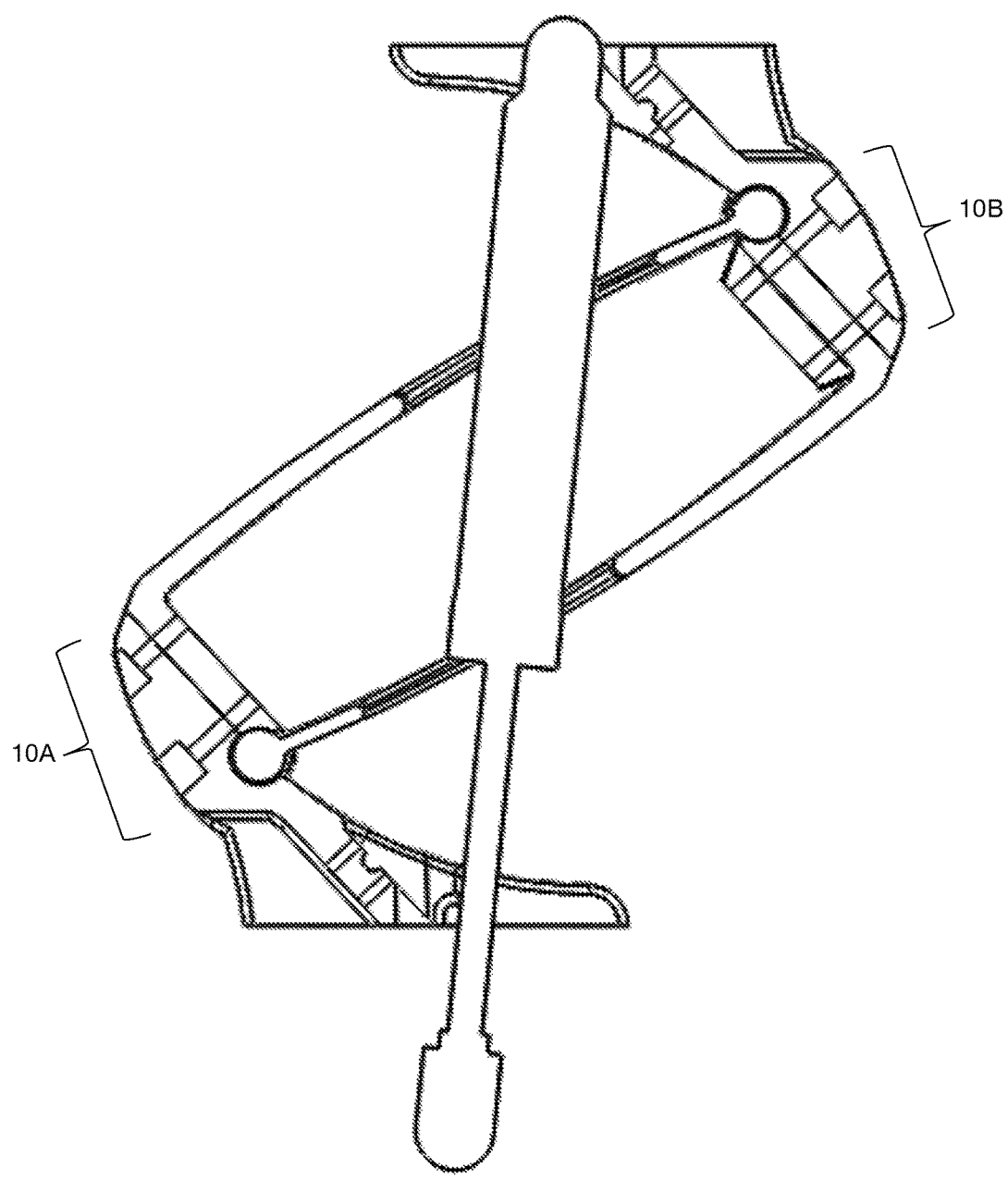
FIG. 8 illustrates a cross sectional view of a single-sided and a double-sided clamping mechanism to retain a fixed end of a spring to a respective mount member.

As previously described, the overall dimensions and material of the spring 2 is important to the functionality of the mitigation apparatus 1. The leaf spring 2 (best seen in FIG. 7) is dimensioned to have a length of 350 mm, width of 300 mm, and thickness starting from 13 mm to a taper of 6 mm when manufactured out injection moulded plastic. Also, the leaf spring 2 includes a kink or fold 9 at the fixed end of the spring 2 to allow the non-pivot or cantilevered end of the spring 2 to be rigidly fixed to the lower mount member 5A by either a single-sided or double-sided clamping mechanism. Examples of the clamping mechanisms are best seen in FIG. 8. As will be appreciated, a double-sided clamping mechanism may provide more secure clamping relative to a single-sided mechanism. Nevertheless, a single-clamping mechanism 10A is preferred as it provides for the lowest cost and weight option.

The free moving pivot 8C or pivotal end of the leaf spring 2 slidingly engages with a recess 7B in the upper mount member 5B. An integral retaining member of the leaf spring 2 in the form of a disc 11 (FIG. 7) minimises lateral movement. The lower and upper mount members 5A,B are linked together via the stabilizer arm 3 and leaf spring 2, the fixed end of which is secured to the lower mount member 5A and clamping mechanism with fasteners in known fashion, thereby clamping the leaf spring 2 therebetween.

The lower and upper mount members 5A,B include moulded brackets (not shown) for mounting a damper 12. The damper 12 is attached to the damper brackets and one end secured to the underside of the upper mount member bracket and the other end to the lower mount member bracket.

Figure 9:
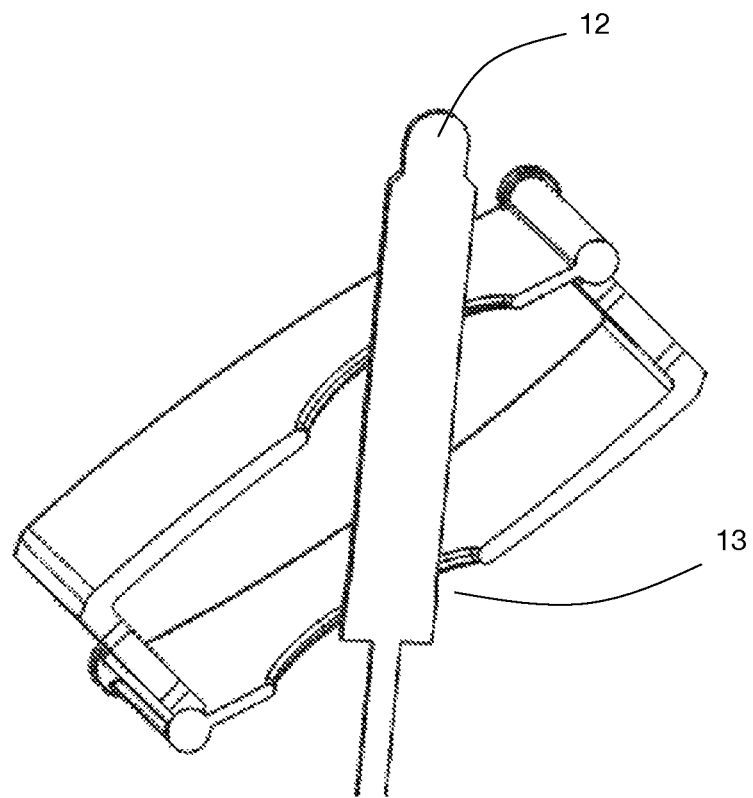

Referring to FIG. 9, the leaf spring 2 also includes an aperture 13 configured to receive the optional damper 12 as above and to tune and control flexure within the leaf spring 2 for shock mitigation in three planes of movement and axes of rotation.

The leaf spring 2 is configured to allow vertical travel of at least 150 mm to avoid bottoming out of the leaf spring 2 against a stop (not shown).

As shown in operation, vertical movement occurs with a constant inclination at the cantilevered end of the leaf, where the stabilizer arm 3 does not flex, but pivots at both ends such that the leaf spring 2 flexes along its length and pivots at one end thereby forming a parabolic curve to prevent a pitching motion.

The amount of pitch is tuned according to required dynamics and characteristics. For example, the amount of pitch is reduced by increasing the length of the stabilizer arm 3, thus in a more horizontal plane and with pivot points 8A,B a further distance apart. Also, the stabilizer arm 3 may be shortened to effect height adjustment depending on user specifications.

FURTHER EXAMPLES

In lieu of the stabilizer arm as described above, the shock mitigation apparatus 1 may include a pair of lower and upper leaf springs in a substantially parallel arrangement with respect to each other for torsional rigidity. The following further examples describe the various configurations of a shock mitigation apparatus 1 with parallel springs sans stabilizer arm. As the components and assembly are substantially the same as for Example 1 above, it will be appreciated like components need not be labelled nor described in detail.

Example 2—Dual Leaf Springs with Free Moving Pivots at the Same End

Figure 2:
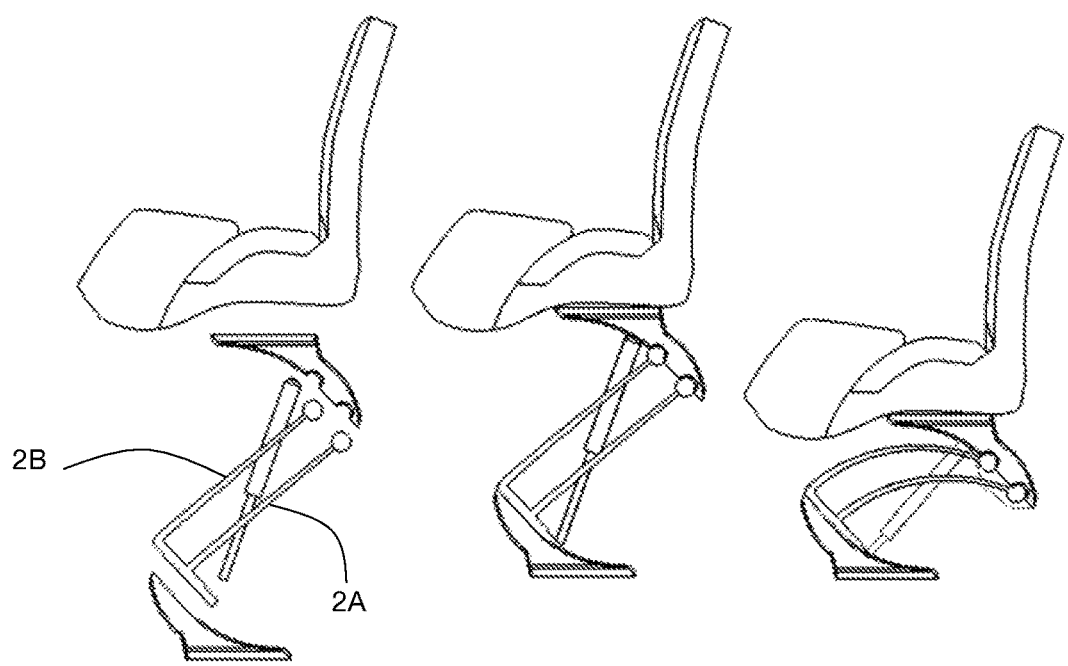
FIG. 2 illustrates a series of side views of a second embodiment of a shock mitigation apparatus that includes a pair of lower and upper leaf springs in a substantially parallel arrangement with respect to each other with pivotal ends on the same mount member (from left to right): an unassembled apparatus with exploded view of components, an assembled apparatus upon an upward rebound stroke, and an assembled apparatus during a compression stroke.

Referring to FIG. 2, a series of side views of a shock mitigation apparatus 1 that includes a pair of lower and upper leaf springs 2A,B in a substantially parallel arrangement with respect to each other with pivotal ends on the same mount member is shown (from left to right): an unassembled apparatus 1 with exploded view of components, an assembled apparatus 1 upon an upward rebound stroke, and an assembled apparatus 1 during a compression stroke.

As shown, the leaf springs 2A,B flex along their length and pivot at the same end with respect to each other as a consequence of the pivotal ends of the springs 2A,B being mounted to the same upper mount member 5B. Conversely, the fixed end of the springs 2A,B are fixedly retained on the lower mount member 5A.

Figure 13:
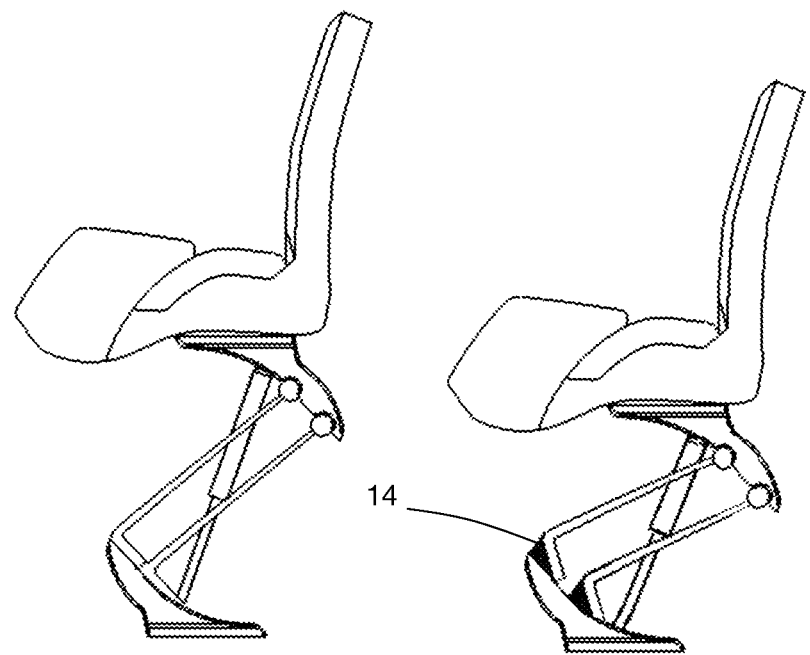
FIG. 13 illustrates side views of a shock mitigation apparatus embodiment before and after adjustment of the seat frame by altering the inclination at both fixed ends of the leaf springs.

An advantage of this configuration is the symmetry of the leaf springs 2A,B which maintain the seat member 4 at the same tilt angle during upward rebound and compression strokes when a downward force may be applied centrally on the seat member 4. Also, the amount of pitch may be reduced by increasing the parallel distance between the springs 2A,B and/or pivots 8A,B. Furthermore, substantially parallel leaf springs configured with pivots 8A,B at the same end or mounted on the same mount member 5A or 5B allow for ease of height adjustability and increased spring firmness. This is because the inclination 14 of both springs 2A,B can be adjusted by altering the inclination 14 at both clamped ends of the leaves and thus adjustment of the seat frame according to user height and/or weight (best seen in FIG. 13).

Example 3—Dual Leaf Springs with Free Moving Pivots on Opposing Ends (Version 1)

Figure 3:
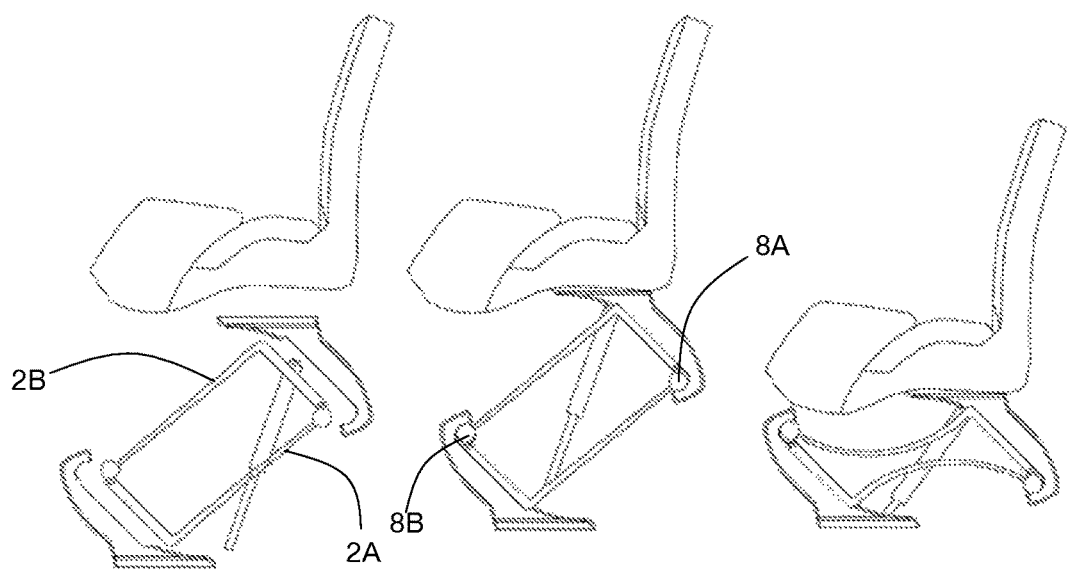
FIG. 3 illustrates a series of side views of a third embodiment of a shock mitigation apparatus that includes a pair of lower and upper leaf springs in a substantially parallel arrangement with respect to each other with pivotal ends on opposing mount members, particularly where the pivot of the upper leaf spring is mounted on the lower mount member and the pivot of the lower leaf spring is be mounted on the upper mount member (from left to right): an unassembled apparatus with exploded view of components, an assembled apparatus upon an upward rebound stroke, and an assembled apparatus during a compression stroke.

Referring to FIG. 3, a series of side views of a shock mitigation apparatus 1 that includes a pair of lower and upper leaf springs 2A,B in a substantially parallel arrangement with respect to each other with pivotal ends 8A,B on opposing mount members 5A,B are shown, particularly where the pivot 8B of the upper leaf spring 2B is mounted on the lower mount member 5A and the pivot 8A of the lower leaf spring 2A is mounted on the upper mount member 5B. Shown from left to right: an unassembled apparatus 1 with exploded view of components, an assembled apparatus 1 upon an upward rebound stroke, and an assembled apparatus 1 during a compression stroke.

As above, the leaf springs 2A,B may flex along their length, but are free to pivot at opposite ends with respect to each other as a consequence of each pivotal end 8A,B of the springs 2A,B being mounted on opposing mount members 5A,B. As shown in FIG. 3, the pivot 8B of the upper leaf spring 2B is mounted on the lower mount member 5A and the pivot 8B of the lower leaf spring 2A is mounted on the upper mount member 5B.

In this configuration, the substantially parallel leaf springs 2A,B are spaced apart to minimise the springs 2A,B contacting one another as they flex inwards towards each other during compression.

In addition, to the previously described advantages above, by positioning the pivots 8A,B at opposite ends they become separated by a larger distance relative to two or more pivots mounted on the same mount member which results in reduced pitching.

Example 4—Dual Leaf Springs with Free Moving Pivots on Opposing Ends (Version 2)

Figure 4:
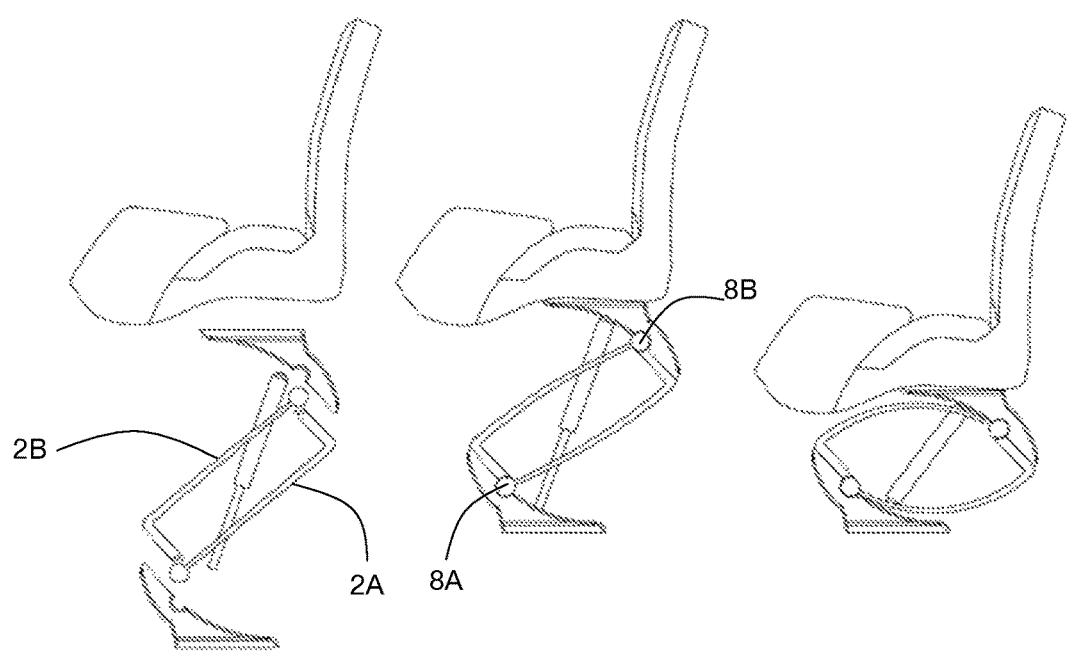
FIG. 4 illustrates a series of side views of a fourth embodiment of a shock mitigation apparatus that includes a pair of lower and upper leaf springs in a substantially parallel arrangement with respect to each other with pivotal ends on opposing mount members, particularly where the pivot of the upper leaf spring is mounted on the upper mount member and the pivot of the lower leaf spring is be mounted on the lower mount member (from left to right): an unassembled apparatus with exploded view of components, an assembled apparatus upon an upward rebound stroke, and an assembled apparatus during a compression stroke.

Referring to FIG. 4, a series of side views of a shock mitigation apparatus 1 that includes a pair of lower and upper leaf springs 2A,B in a substantially parallel arrangement with respect to each other with pivotal ends 8A,B on opposing mount members 5A,B is shown, particularly where the pivot 8A of the upper leaf spring 2B is mounted on the upper mount member 5B and the pivot 8B of the lower leaf spring 2A is mounted on the lower mount member 5A. Shown from left to right: an unassembled apparatus 1 with exploded view of components, an assembled apparatus 1 upon an upward rebound stroke, and an assembled apparatus 1 during a compression stroke.

As above, the leaf springs 2A,B may flex along their length, but are free to pivot at opposite ends with respect to each other as a consequence of each pivotal end 8A,B of the springs 2A,B being mounted on opposing mount members 5A,B. As shown in FIG. 4 and in contrast to Version 1 (FIG. 3) the pivot 8A of the upper leaf spring 2B is mounted on the upper mount member 5B and the pivot 8B of the lower leaf spring 2A is mounted on the lower mount member 5A.

Figure 5:
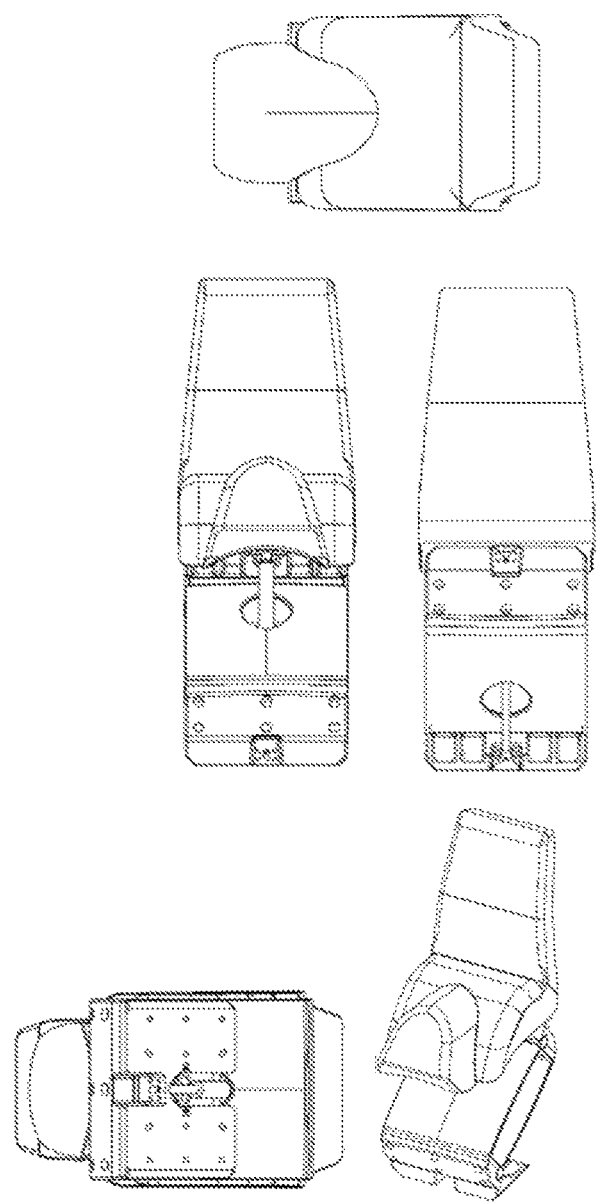
FIG. 5 illustrates a series of views of the same embodiment as shown in FIG. 4, namely top, bottom, front, rear and perspective views of an assembled apparatus upon an upward rebound stroke.
Figure 6:
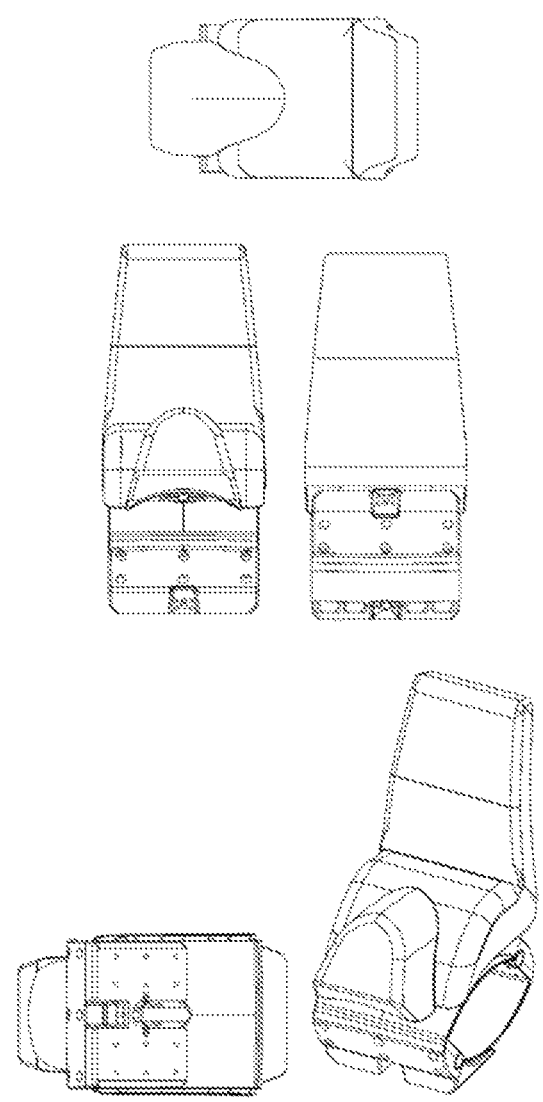
FIG. 6 illustrates a series of views of the same embodiment as shown in FIGS. 4 and 5, namely top, bottom, front, rear and perspective views of an assembled apparatus during a compression stroke.

FIGS. 5 and 6 also show views of this configuration, namely top, bottom, front, rear and perspective views of an assembled apparatus 1 upon an upward rebound stroke and during a compression stroke respectively.

In addition to the advantages previously described above for Version 1, this configuration provides yet a further advantage in that the springs 2A,B flex away from one another during compression (best seen in FIGS. 3 and 5) so that the parallel distance between them is not limited or governed by the amount of flexure. Therefore, the compliance of the apparatus 1 in the fore-aft direction may be adjusted by selecting the appropriate separation distance between the two springs 2A,B. Also, the inventor has found that increasing the separation distance between the two springs 2A,B stiffens the suspension against fore-aft pitching while reducing this distance produces a softer feel to the seat in that direction.

Example 5—Visco-Elastic Versions

Figure 10:
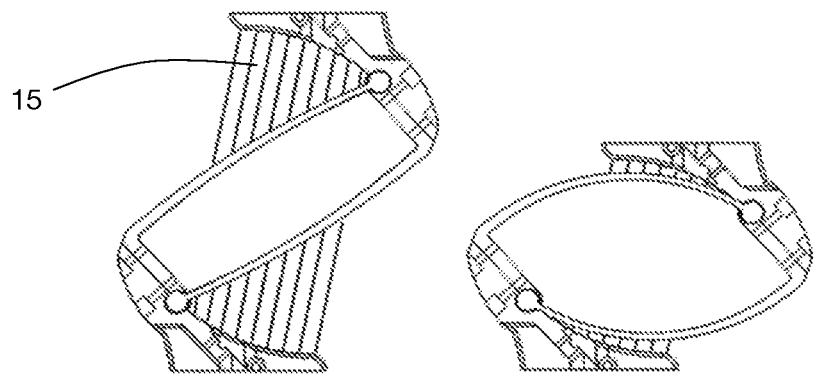
FIG. 10 illustrates a cross-sectional view of an alternative embodiment of a shock mitigation apparatus utilising a visco-elastic material inserted in a space or void therein between a spring and its corresponding mount member to provide damping of the downward motion of the apparatus during compression of the springs.

FIG. 10 illustrates a cross-sectional view of a shock mitigation apparatus 1 that utilises a visco-elastic material 15 inserted in a space or void therein between a spring and its corresponding mount member to provide damping of the downward motion of the apparatus 1 during compression of the springs.

Figure 11:
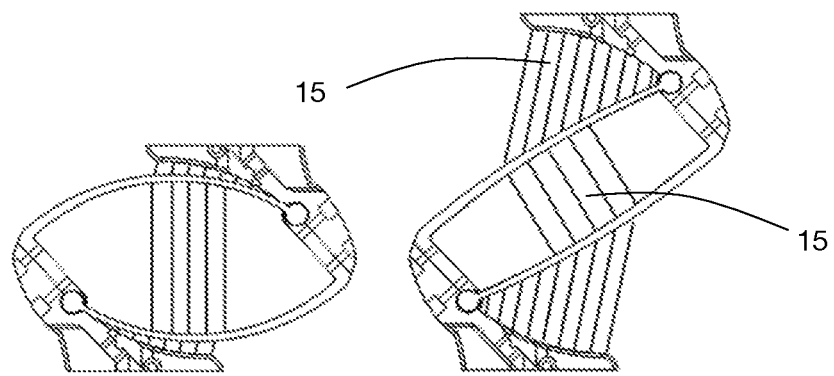
FIG. 11 illustrates a cross-sectional view of an alternative embodiment of a shock mitigation apparatus utilising a visco-elastic material inserted in a space or void therein between adjacent springs to provide damping of the upward motion of the apparatus during rebound of the springs.

FIG. 11 illustrates a cross-sectional view of an alternative embodiment of a shock mitigation apparatus 1 utilising the configuration of visco-elastic material 15 as shown in FIG. 10 for damping of the downward motion, and in addition to that visco-elastic material 15 inserted in a space or void therein between adjacent springs to also provide damping of the upward motion of the apparatus 1 during rebound of the springs.

Example 6—Air Bladder Versions

Figure 14:
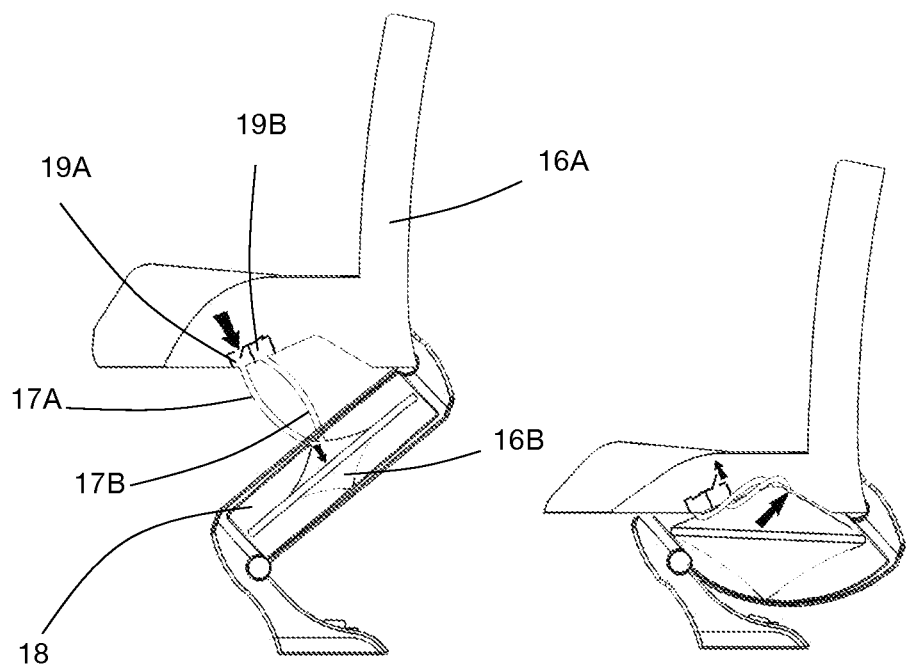
FIG. 14 illustrates a cross sectional view of an alternative embodiment of a shock mitigation apparatus utilising an air bladder system to provide damping of the downward and upward motion of the apparatus during compression and rebound of the springs.

FIG. 14 illustrates cross-sectional views of alternative embodiments of a shock mitigation apparatus 1 where the visco-elastic material (as above in Example 5) is replaced by air bladders or bellows 16A,B with adjustable valves 19A,B to control air-flow in each direction (as indicated by solid arrows).

As shown, one air bladder 16A is located in the seat member and is in fluid communication via tubes 17A,B to another air bladder 16B located in a space or void 18 therein between adjacent springs 2A,B to provide damping of the downward and upward motion of the apparatus 1 during compression and rebound of the springs 2A,B. In this way, in a spring configuration where adjacent springs 2A,B flex away from each other, the air bladder 16B in the void uses the energy released by the decompressing springs 2A,B to pump air back into the air bladder 16A in the seat member for the next impact. For example, during compression of the seat member, air is pumped out of the bladder 16A in the seat member through a control valve 19A and into the air bladder 16B between adjacent springs 2A,B. Conversely, on an upward rebound stroke the reverse occurs where the air bladder 16B deflates between the adjacent springs 2A,B such that the air is pumped back into the seat member bladder 16A, through another control valve 19B. The valves 19A,B are adjustable to allow the desired amount of compression and rebound damping.

What is claimed is:

1. A shock mitigation apparatus including:
   at least one seat member;
   a lower mount member configured to securely mount a first end of at least one leaf spring;
   an upper mount member attached to the seat member, wherein the upper mount member is configured to securely mount a second end of the at least one leaf spring;
   wherein the at least one leaf spring is cantilevered at one end and pivoted at a distal end thereof, and wherein the pivoted end is free to articulate upon flexure of the leaf spring; and
   wherein the apparatus includes a pair of lower and upper leaf springs.

2. A shock mitigation apparatus as claimed in claim 1, wherein the apparatus includes one leaf spring with a stabilizer arm pivotally connected at each end to the lower and upper mount members.

3. A shock mitigation apparatus as claimed in claim 1, wherein the upper and lower leaf springs are in a substantially parallel arrangement with respect to each other for torsional rigidity.

4. A shock mitigation apparatus as claimed in claim 1, wherein the pivotal end of the upper leaf spring is mounted to the upper mount member and the pivotal end of the lower leaf spring is mounted to the lower mount member.

5. A shock mitigation apparatus as claimed in claim 1, wherein at least one of the leaf springs includes a fold or kink at one end of the spring.

6. A shock mitigation apparatus as claimed in claim 5, wherein the fold or kink is located at one fixed end of the spring.

7. A shock mitigation apparatus as claimed in claim 1, wherein at least one of the leaf springs includes at least one aperture.

8. A shock mitigation apparatus including:
   at least one seat member,
   a lower mount member configured to securely mount a first end of at least one leaf spring;
   an upper mount member attached to the seat member, wherein the upper mount member is configured to securely mount a second end of the at least one leaf spring;
   wherein the at least one leaf spring is cantilevered at one end and pivoted at a distal end thereof, and wherein the pivoted end is free to articulate upon flexure of the leaf spring;
   wherein the leaf spring includes at least one aperture; and
   wherein the leaf spring includes an aperture that is substantially centrally located therein.

9. A shock mitigation apparatus as claimed in claim 7, wherein the aperture of at least one of the leaf springs is dimensioned and shaped to tune and control stiffness of the leaf spring for independent control of compliance of three planes of movement and axis of rotation.

10. A shock mitigation apparatus as claimed in claim 1, wherein the flexure of at least one of the leaf springs is tuned to provide more flex approximately at the pivoted region of the leaf spring for an initial soft spring rate response followed by a progressively firmer spring rate response upon further compression of the leaf spring, thereby avoiding bottoming out of the leaf spring against a stop.

11. A shock mitigation apparatus as claimed in claim 1, wherein at least one of the leaf springs includes at least one aperture dimensioned and shaped to allow fitment of a damper to pass through the leaf spring, such that the damper is substantially under the center of mass of the seat and absorbs forces while minimizing moments about the apparatus.

12. A shock mitigation apparatus as claimed in claim 1, wherein at least one of the leaf springs is manufactured out of one of the following materials: plastic, titanium, stainless steel, spring steel or a composite material.

13. A shock mitigation apparatus as claimed in claim 1, wherein uniform stress is achieved by tapering at least one of the leaf springs so that the gauge of material is greater at its fixed end relative to the distal pivotal end of the leaf spring.

14. A shock mitigation apparatus as claimed in claim 1, wherein the shock mitigation apparatus includes a visco-elastic or shear-thickening (non-Newtonian) material to provide compression and/or rebound damping.

15. A shock mitigation apparatus as claimed in claim 14, wherein the visco-elastic material is inserted in a space or void therein between at least one of the leaf springs and a corresponding mount member to provide damping of the downward motion of the apparatus during compression of the leaf springs.

16. A shock mitigation apparatus as claimed in claim 14, wherein the visco-elastic material may be inserted in a space or void therein between adjacent pairs of the springs to provide damping of upward motion of the apparatus during rebound of the springs.

17. A shock mitigation apparatus as claimed in claim 1, wherein a pommel design seat extends forward from a back rest to allow an occupant to sit astride and give maximum lateral stability and a firm footing in use.

18. A shock mitigation apparatus as claimed in claim 1, wherein the seat member includes a swivelling mechanism to enable the seat member to rotate up to 360 degrees with respect to the base assembly.

19. A watercraft including a shock mitigation apparatus as claimed in claim 1.

\* \* \* \* \*